United States Patent [19]

Barber, III

[11] Patent Number: 5,059,152

[45] Date of Patent: Oct. 22, 1991

[54] ANIMAL CARCASS INJECTION SYSTEM

[75] Inventor: Thomas A. Barber, III, Spring, Tex.

[73] Assignee: The BOC Group, Inc., New Providence, N.J.

[21] Appl. No.: 648,687

[22] Filed: Jan. 31, 1991

[51] Int. Cl.$^5$ ............................................. A22C 25/16
[52] U.S. Cl. .................................... 452/135; 452/138
[58] Field of Search ........................ 452/138, 140, 135

[56]  References Cited

U.S. PATENT DOCUMENTS 3,896,522  7/1975  Lapeyre .............................. 452/135
4,213,229  7/1980  Helmer et al. ...................... 452/135

Primary Examiner—James G. Smith
Assistant Examiner—Lawrence Cruz
Attorney, Agent, or Firm—Robert I. Pearlman; David M. Rosenblum

[57] ABSTRACT

The present invention provides an animal carcass injection system that is particularly suitable for injecting carbon dioxide between muscle and bone within an animal carcass to balloon the muscle away from the bone. Such ballooning aids in boning the animal carcass. In accordance with the present invention, a hollow needle is provided having a pointed distal end to puncture the animal carcass and at least one, but preferably four, circumferentially spaced apertures to allow the pressurized gas to escape from the needle upon blockage of the pointed distal end. The aperture(s) act to prevent possible injury arising from an accidental escape of pressurized gas from the pointed distal end of the needle near or against operators of the injection system. The use of four apertures act to more efficiently distribute gas within the animal carcass upon injection of the pressurized gas.

8 Claims, 2 Drawing Sheets

ANIMAL CARCASS INJECTION SYSTEM

BACKGROUND OF THE INVENTION

The present invention relates to an animal carcass injection system for injecting a gas under pressure between muscle and bone of an animal carcass in order to separate the muscle from the bone.

In meat processing plants in which animal carcasses are boned, muscle is separated from bone within the animal carcass by opening the hide and then stripping the muscle away from the bone with knives and saws. As may be appreciated, conventional boning processes are both time consuming and expensive. In an attempt to improve the conventional boning process, the prior art has provided animal carcass injection systems to inject a pressurized gas between the muscle and bone of the animal carcass. The pressurized gas acts to separate the muscle from the bone by ballooning the muscle away from the bone along a natural seam of the animal carcass.

Such prior art carcass injection systems incorporate a hollow needle to effectuate the injection of the pressurized gas between the muscle and bone. In practice, the animal hide is punctured by the needle and thereafter, the needle is operatively extended through the natural seam of the animal carcass to a position against or near the bone. The needle is held by a blow gun with a nozzle extension having a lever operated valve, which when opened by the lever, permits pressurized gas to enter the needle for injection between the muscle and bone.

A major problem associated with prior art animal carcass injection systems is that the use of high pressure air presents a danger to those using such systems. As may be appreciated, an accidental escape of high pressure gas from a sharp needle either near or against the human body can cause injury or death.

Another problem concerns the source and type of pressurized gas used in the prior art. Such pressurized gas can be pressurized air supplied by a shop air system. The use of shop air presents a problem because there is no practical manner to assure its cleanliness. In fact, shop air can contain air borne bacteria or contaminated particulate matter that can be injected into the animal carcass by injection of the shop air.

The present invention provides a carcass injection system that incorporates a needle having a safety feature to lessen the possibility of injury to workers from an accidental escape of pressurized gas from the sharp end of the needle. In addition, the animal carcass injection system is particularly well suited for use with pressurized carbon dioxide suppled by a carbon dioxide refrigerant system. The use of such pressurized carbon dioxide helps eliminate the contamination problems associated with the use of shop air because it is supplied below freezing temperatures and the carbon dioxide refrigerant system is a closed system.

SUMMARY OF THE INVENTION

The present invention provides an animal carcass injection system for separating muscle from bone with a pressurized gas supplied by a gas source. The animal carcass injection system incorporates a hollow needle to inject the pressurized gas between the muscle and bone. The hollow needle has a pointed distal end to puncture the animal carcass and from which the pressurized gas is injected and a proximal end located opposite to the pointed distal end. As a safety feature the hollow needle is provided with aperture means which can comprise one or more apertures for allowing the pressurized gas to escape from the needle upon blockage of the needle at the distal end thereof. In the event that the animal carcass injection system of the present invention is inadvertently activated when the pointed distal end of the hollow needle is blocked as by contact with a worker, the pressurized gas will escape from the aperture(s) to prevent injury to the worker.

The hollow needle is held and directed at its proximal end by means which preferably comprise an air gun having actuable valve means in the form of a lever operated valve for allowing the pressurized gas to flow through the hollow needle upon actuation thereof. The pressurized gas is delivered from the gas source to the needle holding and directing means by delivery means which preferably include a filtering system to filter the pressurized gas. If the pressurized gas is carbon dioxide vapor supplied by a carbon dioxide refrigerant system located within a meat processing plant, the filtering system can include a coalescing filter for removing oil and moisture followed by a particulate filter to remove possible particulate contamination. As a result of such a filtering system, the carbon dioxide can be injected into the animal carcass substantially free of any possible dangerous contaminants.

BRIEF DESCRIPTION OF THE DRAWINGS

While the specification concludes with claims particularly pointing out the subject matter that Applicant regards as his invention, it is believed that the invention will be better understood from the following description taken in conjunction with the accompanying drawings in which:

DETAILED DESCRIPTION

Figure 1:
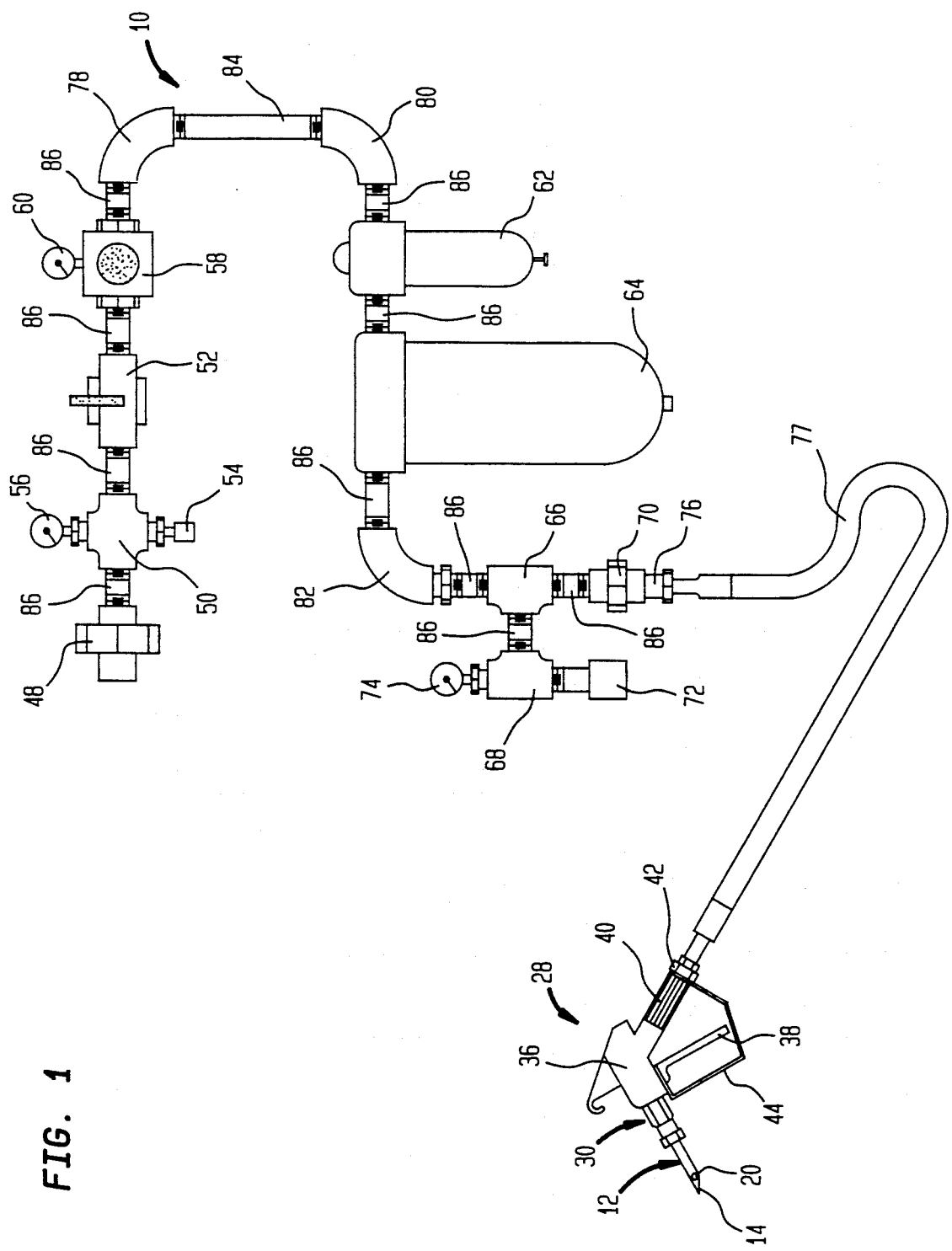
FIG. 1 is an elevational view of an animal carcass injection system of the present invention.
Figure 2:
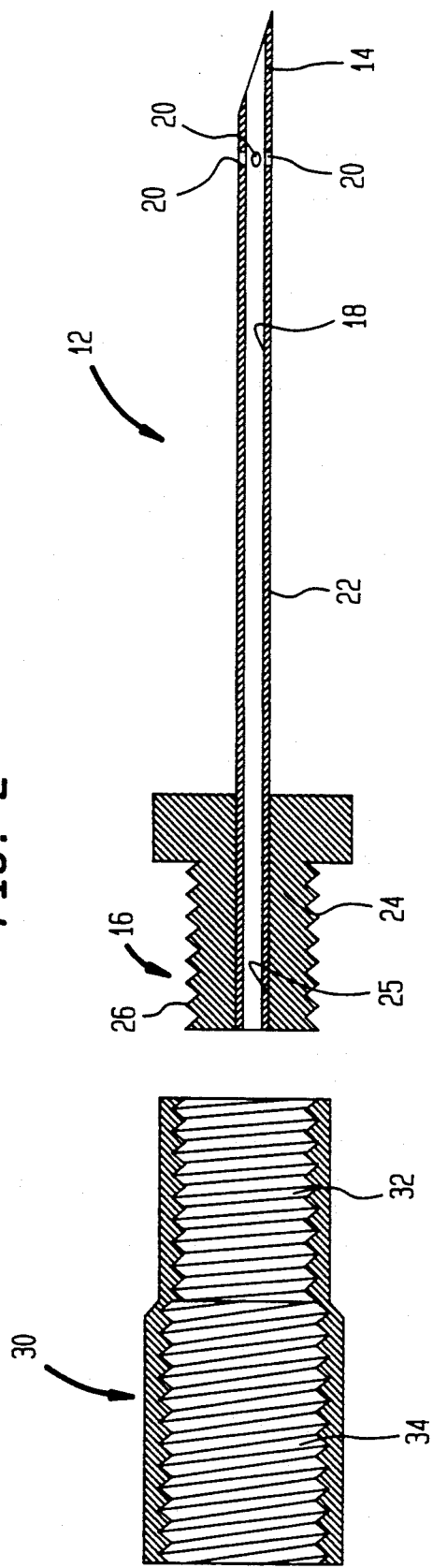
FIG. 2 is an exploded cross-sectional view illustrating a hollow needle and a chuck in accordance with the present invention.

With reference to FIGS. 1 and 2, an animal carcass injection system 10 in accordance with the present invention is illustrated. Animal carcass injection system 10 is particularly well suited to inject carbon dioxide supplied from a storage tank used as an adjunct of a carbon dioxide refgrigerant system for solidifying carbon dioxide. The use of carbon dioxide from such a source is advantageous because it is supplied from a closed system; and therefore, there is a decreased possibility that the carbon dioxide could be contaminated with bacteria. In addition, since such carbon dioxide has a temperature of 0° F. or less, it is particularly bacteriostatic. In addition to the foregoing, the use of cold carbon dioxide is advantageous because its injection can aid in preserving the meat removed from the animal carcass.

Animal carcass injection 10 is provided with a needle 12 for injecting the pressurized carbon dioxide between muscle and bone within the animal carcass. Needle 12 has a pointed distal end 14, a proximal end 16 and an axial bore 18 communicating between pointed distal end 14 and a proximal end 16.

Pointed distal end 14 is preferably provided with a taper of about 20.0°, so that pointed distal end 14 is operable to easily puncture the hide of the animal carcass. In this regard, pointed distal end 14 can be provided with a greater angle of taper, but preferably no more than about 45.0°. A set of four apertures 20 are provided adjacent pointed distal end 14. As has been discussed above, high pressure gas accidentally escaping from pointed distal end 14 can cause injury to those using animal carcass injection system 10. Apertures 20 act as pressure relief holes to allow the escape of pressurized carbon dioxide vapor from hollow needle 12 in the event of blockage of hollow needle 12 at pointed distal end 14. If, for instance, animal carcass injection system 12 is activated while pointed distal end 14 of hollow needle 12 is against or near a worker, carbon dioxide will escape from apertures 20 to relieve the pressure exerted against the worker by the carbon dioxide. It is to be noted that hollow needle 12 could be constructed with a single aperture for such pressure relief purpose. However, four apertures 20 are preferred to increase the distribution of carbon dioxide vapor within the animal carcass during the injection thereof.

In the preferred embodiment hollow needle 12 is held and directed by proximal end 16, which for such purpose, has a greater thickness than the remainder of hollow needle 12. Although hollow needle 12 could be entirely machined from a single stock, preferably, hollow needle 12 is formed from a rod 22 and a plug 24. Plug 24 forms proximal end 16 of hollow needle 12 and is provided with a center bore 25 to receive rod 22, at one end, in a force fitting relationship. Plug 24 is about 1.27 cm. in diameter and has an external thread 26 for purposes that will be discussed hereinafter. Rod 22 is constructed from a stainless steal tube having a length of about 10.16 cm., a wall thickness of about 0.889 mm. and an outer diameter of about 0.635 cm. An end cut of about 20° in the other of the ends of rod 22 is used to form pointed distal end 14. Apertures 20 are formed from four circumferentially spaced #60 holes drilled in rod 22 about 0.635 cm. back from the tip of pointed distal end 14.

Hollow needle 12 is held and directed by an air gun 28 of animal carcass injection system 10. Air gun 28 is preferably a modified Model LX-80 air gun manufactured by Titan Tool Inc. of 107 Baur Dr., Oakland, N.J. 07436. The LX-80 air gun is modified by replacement of a supplied tip seal and safety guard assembly with a chuck 30 specifically designed to hold hollow needle 12. Chuck 30 is provided with a narrow internally threaded bore 32 of about 1.27 cm. in diameter to threadably receive plug 24 and an enlarged internally threaded bore 34 of about 1.43 cm., contiguous with narrow internally threaded bore 32, to connect chuck 30 to an outlet of a lever operated valve 36 of air gun 28. Lever operated valve 36 is a two position valve that is normally closed. Upon movement of a trigger 38 of lever operated valve 36 toward a pistol grip 40, lever operated valve 36 is set in an open position to allow carbon dioxide vapor to flow into hollow needle 12. Pistol grip 40 is connected to an inlet of lever operated valve 36 and is provided with a passageway containing a final filter for filtering carbon dioxide vapor just prior to its flow through lever operated valve 36 and hollow needle 12. Air gun 28 is also provided with a swivel end assembly 42 connected to the lower end of pistol grip 40 and a trigger guard 44 to prevent accidental activation of lever operated valve 36 and thus, exposure of workers to high pressure carbon dioxide vapor.

Animal carcass injection system 10 is specifically designed to be used with a carbon dioxide refrigerant system in which carbon dioxide vapor is supplied at a pressure of about 21.09 kg/cm². The following discussion relates to the components of animal carcass injection system 10 that are used to deliver the supplied carbon dioxide vapor to air gun 28. As will be discussed, the pressure of the supplied carbon dioxide vapor is first reduced and is then filtered to remove possible contaminants present in the carbon dioxide vapor.

A screwed union 48 is provided for connection of animal carcass injection system 10 to the carbon dioxide refrigerant system. For instance, animal carcass injection system 10 could be connected directly to the carbon dioxide supply tank of the refrigerant system or to the vapor lines located within the meat processing plant. The carbon dioxide vapor first flows through a four-way tee 50 and then through a stainless ball valve 52 that can be selectively set in an open position when animal carcass injection system 10 is in use and in a closed position to cut off the flow of carbon dioxide vapor when not in use. A safety valve 54, set at 24.605 kg/cm² and connected to one of the legs of four-way tee 50, is provided to prevent damage to delivery system 46 in the event that liquid carbon dioxide is trapped between screwed union 48 and stainless ball valve 52. A glycerine filled gauge 56 is connected to another leg of four-way tee 50 opposite to safety valve 54. Gauge 56 has a scale reading range of between 0.0 and 42.18 kg/cm² to allow for verification of the set position of ball valve 52 and the pressure of the carbon dioxide vapor as supplied.

The carbon dioxide flows from stainless ball valve 52 to a pressure regulator 58 provided with a glycerine filled gauge 60 having a scale reading range of between about 0.0 and about 21.09 kg/cm². Pressure regulator 58 is operable to reduce the pressure of the entering carbon dioxide vapor to about 8.788 kg/cm².

After the step-down in carbon dioxide pressure, the carbon dioxide is filtered in filters 62 and 64 to remove possible contamination from the carbon dioxide vapor. As may be appreciated by those skilled in the art, in a closed systems such as a carbon dioxide refrigeration system, the possible contaminants are oil present in the supply tank or scaling throughout the system. After such filtration, the carbon dioxide vapor is essentially free of possible liquid or particulate contamination that would otherwise be injected into the animal carcass along with the carbon dioxide vapor. Filter 62 is a high performance coalescing filter, preferably a model F45-621-MODA (GR#5Z251) filter manufactured by C. A. Norgren Co. of Littleton, Colo., 80120. Filter 62 is effective to remove oil and moisture contamination of down to about 0.01 microns in droplet size. Filter 64 is a particulate filter, preferably a model LMOSS10S-3/4 filter containing a model DFN 0.2-20UN element manufactured by FILTERITE of Timonium, Md. Filter 64 is capable of filtering particles down to about 0.01 microns in size.

After filter 64, the carbon dioxide vapor flows through a tee 66 having an opposed tee 68 connected to its central leg and a screwed union 70 connected to its adjacent leg. The opposite legs of tee 68 are provided with a safety valve 72 set at about 14.06 kg/cm² and a glycerine filled gauge 74 having a scale reading range of between about 0.0 and 21.09 kg/cm². The reading of gauge 74 can be compared with that of gauge 60 to determine whether filters 62 and 64 are producing an excessive pressure drop that would be indicative of their replacement. It is to be noted that positive readings of gauges 62 and 64 indicate that stainless ball valve 52 is in its open position. Safety valve 72 is provided to prevent damage to filters 62 and 64 from over pressures produced by possible failure of pressure regulator 58. A reducer bushing 76 is connected to screwed union 70 and a stainless double braid flex hose 77, about 7.315 meters long, is connected, at one end to reducer bushing 76 and, at the other end, to swivel end assembly 42 of air gun 28.

As illustrated, four-way tee 50, stainless ball valve 52, pressure regulator 58, filters 62 and 64, tee 66 and opposed tee 68, etc. are compactly arranged by provision of a set of elbows, 78, 80 and 82. Elbows 78 and 80 are joined by an elongated pipe nipple 84. All of the other aforementioned components are joined by pipe nipples 86.

In a meat processing plant two gun points would be provided, each by an animal carcass injection system 10. One of the gun points would be located on a stand for the upper quarters of the animal carcass and the other of the gun points would be located on the production floor for the lower quarters. In use, hollow needle 12 is operatively positioned to puncture the animal carcass at selected points, usually the round, rib, and chuck areas. Hollow needle 12 is then extended along a natural animal seam until pointed distal end 14 encounters bone. At this point, trigger 38 is squeezed against pistol grip 40 of air gun 28 to cause the carbon dioxide vapor to balloon the muscle from the bone without causing damage to the meat.

It is to be noted while the present invention has been described relative to a preferred embodiment that is well suited to inject pressurized carbon dioxide vapor, the present invention is not limited to the use of carbon dioxide vapor. As may be appreciated by those skilled in the art that it is possible to construct an embodiment of the present invention that is suited to inject other pressurized gases, for instance, nitrogen.

While preferred embodiments of the invention have been shown and described in detail, it will be readily understood and appreciated by those skilled in the art, that numerous omissions, changes and additions may be made without departing from the spirit and scope of the invention.

I claim:

1. An animal carcass injection system for separating muscle from bone with a pressurized gas supplied by a gas source, said animal carcass injection system comprising:

a hollow needle to inject the pressurized gas between the muscle and bone, the hollow needle having a pointed distal end to puncture the animal carcass and from which the pressurized gas is injected, a proximal end located opposite to the pointed distal end, and aperture means located adjacent the pointed distal end for allowing the pressurized gas to escape from the hollow needle upon blockage of the hollow needle at the pointed distal end thereof;

means for holding the hollow needle at its proximal end and for directing the hollow needle into an operative position, within the animal carcass, in which the pointed distal end of the hollow needle is between the muscle and bone to be separated, said holding and directing means having, actuable valve means for allowing the pressured gas to flow through the hollow needle upon actuation thereof; and delivery means for delivering pressurized gas from the gas source to the needle holding and directing means.

2. The animal carcass injection system of claim 1, wherein the aperture means comprises a set of four circumferentially spaced apertures.

3. The animal carcass injection system of claim 1, wherein the pointed distal end of the hollow needle has a taper of about 20°.

4. The animal carcass injection system of claim 1, wherein the delivery means has filtering means for initially filtering oil and moisture of down to about 0.01 microns in size and subsequently, before the pressurized gas reaches the hollow needle holding and directing means, particulate matter down to about 0.02 microns in size.

5. The animal carcass injection system of claim 1, wherein:

the proximal end of the hollow needle is enlarged and has an external thread; and the hollow needle holding and directing means comprises an air gun including a normally closed lever operated valve to form the actuable valve means and a chuck connected to the valve and having an internally threaded bore to threadably receive the proximal end of the hollow needle.

6. The animal carcass injection system of claim 5, wherein the aperture means comprises a set of four circumferentially spaced apertures.

7. The animal carcass injection system of claim 6, wherein the pointed distal end of the hollow needle has a taper of about 20°.

8. The animal carcass injection system of claim 7, wherein the delivery means has a coalescing filter for initially filtering oil and moisture of down to about 0.01 microns in size and subsequently, before the pressurized gas reaches the air gun, a particulate filter for filtering particulate matter down to about 0.02 microns in size.

* * * * *